United States Patent
Choi et al.

(10) Patent No.: US 11,942,635 B2
(45) Date of Patent: Mar. 26, 2024

(54) POSITIVE ELECTRODE ACTIVE MATERIAL AND LITHIUM SECONDARY BATTERY COMPRISING THE SAME

(71) Applicant: ECOPRO BM CO., LTD., Cheongju-si (KR)

(72) Inventors: Moon Ho Choi, Cheongju-si (KR); Jun Won Suh, Cheongju-si (KR); Jin Kyeong Yun, Cheongju-si (KR); Jung Han Lee, Cheongju-si (KR); Mi Hye Yun, Cheongju-si (KR); Seung Woo Choi, Cheongju-si (KR); Gwang Seok Choe, Cheongju-si (KR); Ye Ri Jang, Cheongju-si (KR); Joong Ho Bae, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 301 days.

(21) Appl. No.: 17/035,672

(22) Filed: Sep. 28, 2020

(65) Prior Publication Data
US 2021/0119205 A1  Apr. 22, 2021

(30) Foreign Application Priority Data

Oct. 18, 2019  (KR) .................... 10-2019-0129755

(51) Int. Cl.
*H01M 4/525* (2010.01)
*H01M 4/02* (2006.01)
(Continued)

(52) U.S. Cl.
CPC ......... *H01M 4/525* (2013.01); *H01M 4/131* (2013.01); *H01M 4/366* (2013.01); *H01M 4/505* (2013.01);
(Continued)

(58) Field of Classification Search
CPC .................................................... H01M 4/525
See application file for complete search history.

(56) References Cited

U.S. PATENT DOCUMENTS

| 10,693,136 B2 * | 6/2020 | Choi ...................... C30B 7/14 |
| 2016/0049649 A1 | 2/2016 | Noh et al. |
| 2018/0013145 A1 * | 1/2018 | Choi ...................... C01G 53/42 |

FOREIGN PATENT DOCUMENTS

| JP | 2015-214464 A | 12/2015 |
| JP | 2018-022676 A | 2/2018 |
| WO | 2008/092568 A1 | 8/2008 |

OTHER PUBLICATIONS

Yang-Kook Sun et al., "High-energy cathode material for long-life and safe lithium batteries", Nature Materials, vol. 8, No. 4, Mar. 22, 2009, pp. 320-324, https://doi.org/10.1038/nmat2418.

* cited by examiner

*Primary Examiner* — Stephan J Essex
(74) *Attorney, Agent, or Firm* — Studebaker & Brackett PC

(57) ABSTRACT

The present invention relates to a positive electrode active material and a lithium secondary battery using a positive electrode containing the positive electrode active material. More particularly, the present invention relates to a positive electrode active material that is able to solve a problem of increased resistance according to an increase in Ni content by forming a charge transport channel in a lithium composite oxide and a lithium secondary battery using a positive electrode containing the positive electrode active material.

11 Claims, 17 Drawing Sheets

(51) Int. Cl.
*H01M 4/131* (2010.01)
*H01M 4/36* (2006.01)
*H01M 4/505* (2010.01)
*H01M 10/0525* (2010.01)

(52) U.S. Cl.
CPC .. *H01M 10/0525* (2013.01); *H01M 2004/021* (2013.01); *H01M 2004/028* (2013.01); *Y02E 60/10* (2013.01)

Ni Kα1

Ni Kα1

Co Kα1

500nm

Mn Kα1

500nm

-- Prior Art --

-- Prior Art --

-- Prior Art --

-- Prior Art --

POSITIVE ELECTRODE ACTIVE MATERIAL AND LITHIUM SECONDARY BATTERY COMPRISING THE SAME

CROSS-REFERENCE TO RELATED APPLICATION

This application claims priority to and the benefit of Korean Patent Application No. 10-2019-0129755, filed on Oct. 18, 2019, the disclosure of which is incorporated herein by reference in its entirety.

BACKGROUND

1. Field of the Invention

The present invention relates to a positive electrode active material and a lithium secondary battery using a positive electrode containing the positive electrode active material.

2. Discussion of Related Art

Batteries store electrical power by using materials facilitating an electrochemical reaction at a positive electrode and a negative electrode. As a representative example of such batteries, there is a lithium secondary battery storing electrical energy due to a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is manufactured by charging an organic electrolyte solution or a polymer electrolyte solution between the positive electrode and the negative electrode.

A lithium composite oxide is used as a positive electrode active material of the lithium secondary battery, and composite oxides such as $LiCoO_2$, $LiMn_2O_4$, $LiNiO_2$, $LiMnO_2$, etc. are being studied.

Among the positive electrode active materials, $LiCoO_2$ is most widely used due to excellent lifetime characteristics and charge/discharge efficiency, but it is expensive because of the limited resource of cobalt, which is used as a raw material, and thus has a disadvantage of limited price competitiveness.

Lithium manganese oxides such as $LiMnO_2$ and $LiMn_2O_4$ have advantages of excellent thermal safety and low costs, but also have problems of small capacity and poor high-temperature characteristics. In addition, while a $LiNiO_2$-based positive electrode active material exhibits a battery characteristic such as a high discharge capacity, due to cation mixing between Li and a transition metal, it is difficult to synthesize the $LiNiO_2$-based positive electrode active material, thereby causing a big problem in rate characteristics.

In addition, depending on the intensification of such cation mixing, a large amount of Li by-products is generated, and since most of the Li by-products consist of compounds of LiOH and $Li_2CO_3$, they become a cause of gelation in preparation of a positive electrode paste and gas generation according to charge/discharge progression after the preparation of an electrode. Residual $Li_2CO_3$ increases the swelling phenomenon of a cell and thus reduces cycles and also leads to the swelling of a battery.

Meanwhile, recently, as a positive electrode active material, Ni, Co, Mn and/or Al-complexed lithium composite oxide(s) have been developed. Generally, these lithium composite oxides are increased in energy density and improved in output characteristics as an Ni content increases similar to a $LiNiO_2$-based positive electrode active material. However, there is a problem of increased resistance characteristics. Therefore, in the Ni, Co, Mn and/or Al-complexed lithium composite oxide(s), there is a demand for the development of a positive electrode active material which can maintain the excellent reversible capacity of $LiNiO_2$ and prevent degradation of resistance and lifetime characteristics.

SUMMARY OF THE INVENTION

In the lithium secondary battery market, the growth of lithium secondary batteries for electric vehicles plays a leading role, and the demand for positive electrode materials used in lithium secondary batteries is also constantly changing.

For example, conventionally, in terms of the achievement of safety, lithium secondary batteries using LFP have been mainly used. However, recently, the use of a nickel-based lithium composite oxide, which has a larger energy capacity per weight than LFP, is expanding.

In accordance with the trend of such a positive electrode material, the present invention is directed to providing a high-Ni-type lithium composite oxide and/or a positive electrode active material including the lithium composite oxide for implementing a high capacity automobile cell. However, in the case of the high-Ni-type lithium composite oxide known so far, as the Ni content increases, resistance increases and a lifetime is thus deteriorated.

Accordingly, the present invention is directed to providing a lithium composite oxide and/or a positive electrode active material including the lithium composite oxide, which can solve a problem of improving resistance according to an increase in Ni content by forming a charge transport channel in the lithium composite oxide.

In addition, the present invention is directed to providing a positive electrode slurry composition, which includes the positive electrode active material defined in the present invention.

Moreover, the present invention is directed to providing a lithium secondary battery, which includes a positive electrode formed by coating a current collector with the positive electrode slurry composition defined in the present invention.

The objects of the present invention are not limited to the above-mentioned objects, and other objects and advantages of the present invention which are not mentioned can be understood by the following description and more clearly understood by exemplary embodiments of the present invention. In addition, it will be readily apparent that the objects and advantages of the present invention may be realized by means determined by the claims and a combination thereof.

One aspect of the present invention provides a positive electrode active material, which includes primary particles enabling lithium intercalation and deintercalation and secondary particles formed by aggregating the primary particles.

Here, the secondary particle may have a first concentration gradient section in which the concentration of at least one selected from nickel, cobalt and manganese in the secondary particle increases, and a second concentration gradient section in which the concentration of at least one selected from nickel, cobalt and manganese in the secondary particle decreases, along the circumferential surface of the secondary particle.

In one embodiment, the first concentration gradient section and the second concentration gradient section may be selectively present in a surface region of the secondary particle.

In addition, along the circumferential surface of the secondary particle, the first concentration gradient section and the second concentration gradient section may be repeatedly present.

In another aspect of the present invention, a positive electrode slurry composition, which includes a positive electrode active material defined in the present invention, a conductive material and a binder, is provided.

In still another aspect of the present invention, a lithium secondary battery, which includes a positive electrode formed by coating a current collector with the positive electrode slurry composition defined in the present invention, is provided.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
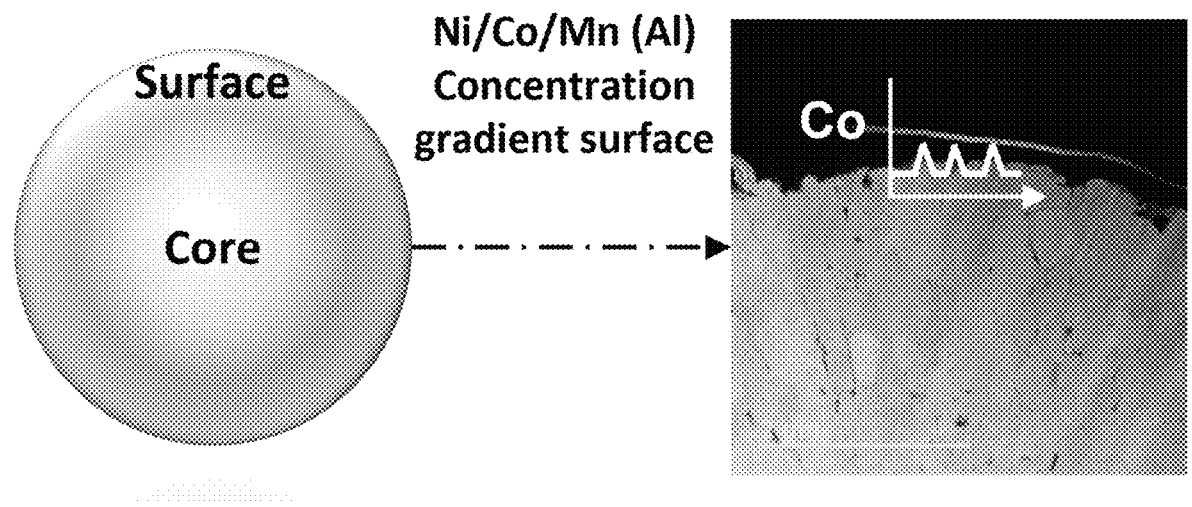
FIG. 1 schematically shows a positive electrode active material according to one embodiment of the present invention and the concentration gradient of a metal element in the positive electrode active material.

To facilitate a better understanding of the present invention, specific terms are defined in the present invention for convenience. Unless particularly defined otherwise, scientific and technical terms used herein will have meanings generally understood by those of ordinary skill in the art. In addition, it should be understood that, unless particularly indicated in the context, the singular forms include plural forms thereof, and the plural terms also include singular forms thereof.

Hereinafter, a positive electrode active material according to the present invention and a lithium secondary battery using a positive electrode including the positive electrode active material will be described in further detail.

Positive Electrode Active Material

According to one aspect of the present invention, a positive electrode active material, which includes primary particles enabling lithium intercalation and deintercalation and secondary particles in which the primary particles are aggregated, is provided.

Here, the primary particle refers to one grain or crystallite, and the secondary particle refers to an aggregate formed by aggregating a plurality of the primary particles. The primary particle may have a rod shape, an oval shape and/or an irregular shape. There may be a void and/or a grain boundary between the primary particles constituting the secondary particle.

Here, the secondary particle may include a first concentration gradient section in which the concentration of at least one selected from nickel, cobalt and manganese increases along the circumferential surface of the secondary particle and a second concentration gradient section in which the concentration of at least one selected from nickel, cobalt and manganese decreases therealong.

The first concentration gradient section and the second concentration gradient section, defined herein, are terms used to distinguish regions in which the concentration of at least one selected from nickel, cobalt and manganese increases and decreases, and is not necessarily interpreted as being limited to the ordinal number modifying a concentration gradient section.

As described above, since the secondary particle has a first concentration gradient section and a second concentration gradient section, which exhibit concentration gradients in which at least one concentration is continuously or discontinuously increasing and decreasing, a charge transport channel may be formed in a positive electrode active material. The charge transport channel formed by the presence of such different types of concentration gradient sections in the secondary particle may solve a resistance issue of the positive electrode active material according to the increased Ni content. Therefore, it can contribute to the improvement in electrochemical characteristics such as lifetime and efficiency characteristics of the positive electrode active material.

The concentration of at least one selected from nickel, cobalt and manganese in the first concentration gradient section and the second concentration gradient section may show a continuously or discontinuously changing concentration gradient.

Accordingly, the concentration of at least one selected from nickel, cobalt and manganese in the first concentration gradient section may show a continuously or discontinuously increasing concentration gradient, and the concentration of at least one selected from nickel, cobalt and manganese in the second concentration gradient section may show a continuously or discontinuously decreasing concentration gradient.

At least one selected from nickel, cobalt and manganese in the first concentration gradient section may increase to a concentration higher than at least one average content selected from nickel, cobalt and manganese in the secondary particle.

Figure 4:
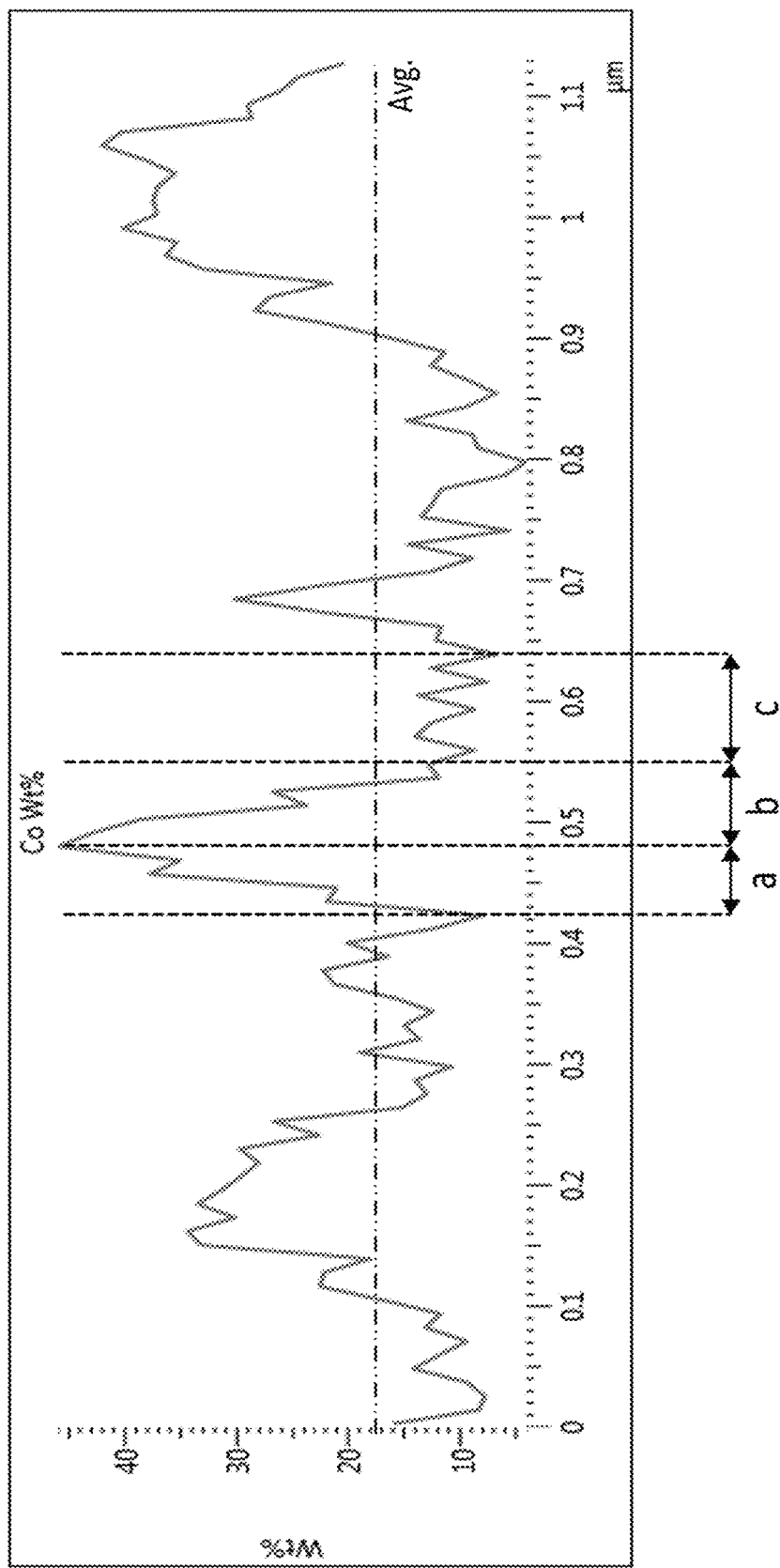

For example, referring to FIG. 4, when the metal element forming a concentration gradient in the first concentration gradient section (a) is cobalt, the cobalt in the first concentration gradient section (a) may increase to a concentration higher than an average content (Avg) of cobalt in the secondary particle. That is, the maximum content of the cobalt in the first concentration gradient section (a) may be higher than the average content (Avg) of cobalt in the secondary particle.

In one embodiment, metal elements forming the concentration gradients in the first concentration gradient section and the second concentration gradient section may include cobalt, cobalt and manganese or nickel, cobalt and manganese. Here, nickel in the first concentration gradient section and the second concentration gradient section may show a concentration gradient which tends to be opposite to that of cobalt or cobalt and manganese.

That is, when the concentration of cobalt or cobalt and manganese in the first concentration gradient section shows a continuously or discontinuously increasing concentration gradient, the concentration of nickel in the second concentration gradient section may show a continuously or discontinuously decreasing concentration gradient. On the contrary, when the concentration of cobalt or cobalt and manganese in the second concentration gradient section shows a continuously or discontinuously decreasing concentration gradient, the concentration of nickel in the second concentration gradient section may show a continuously or discontinuously increasing concentration gradient.

In addition, an increase rate of the concentration of at least one selected from nickel, cobalt and manganese in the first concentration gradient section may be 5 wt % or more per 0.1 μm, but the present invention is not necessarily limited thereto. That is, at least one selected from nickel, cobalt and manganese in the first concentration gradient section (hereinafter, referred to as specific metal elements) increases in an average content direction or to a concentration higher than an average content of specific metal elements in the secondary particle.

Here, the average content direction may refer to a slope (vector) direction when the concentration of a specific metal element in the secondary particle increases or decreases toward the average content in the secondary particle on line sum spectra indicating a change in concentration of specific metal elements in the secondary particle.

On the other hand, at least one selected from nickel, cobalt and manganese in the second concentration gradient section may decrease to a concentration lower than at least one average content selected from nickel, cobalt and manganese in the secondary particle.

For example, referring to FIG. 4, when the metal element forming a concentration gradient in the second concentration gradient section (b) is cobalt, cobalt in the second concentration gradient section (b) may decrease in the average content (Avg) direction of cobalt in the secondary particle.

Here, the decrease of cobalt in the average content (Avg) direction of cobalt in the secondary particle in the second concentration gradient section (b) means that, when the content of cobalt at an arbitrary point in the second concentration gradient section (b) is higher than the average content (Avg) of cobalt in the secondary particle, the content of cobalt at the certain point in the second concentration gradient section (b) decreases to the average content (Avg) level of cobalt in the secondary particle.

In addition, a decrease rate of the concentration of at least one selected from nickel, cobalt and manganese in the first concentration gradient section may be 5 wt % or more per 0.1 μm, but the present invention is not necessarily limited thereto. That is, at least one selected from nickel, cobalt and manganese in the first concentration gradient section (hereinafter, referred to as a specific metal element) decreases in an average content direction of the specific metal element in the secondary particle.

Meanwhile, the presence of the first concentration gradient section and the second concentration gradient section along the circumferential surface of the secondary particle should be understood as a concept different from the presence of a concentration gradient in the direction toward a surface region of the secondary particle from a core region of the secondary particle.

For example, when the secondary particle has a spherical or sphere-like shape, the first concentration gradient section and the second concentration gradient section may be present along the circumferential direction of the secondary particle.

Accordingly, in the first concentration gradient section, the concentration of at least one selected from nickel, cobalt and manganese increases along the circumferential surface of the secondary particle, and in the second concentration gradient section, the concentration of at least one selected from nickel, cobalt and manganese may decrease along the circumferential surface of the secondary particle.

In one embodiment, the secondary particle may include a core region accounting for 1 to 90 vol % of the total volume of the secondary particle from the center of the secondary particle and a surface region surrounding the outside of the core region.

Here, the first concentration gradient section and the second concentration gradient section may be selectively present in the surface region, or in both of the core region and the surface region.

As the first concentration gradient section and the second concentration gradient section are selectively present in the surface region, the first concentration gradient section and the second concentration gradient section may be present up to a certain depth from the surface region toward the core region of the secondary particle.

That is, the concentration gradient in which the concentration of at least one selected from nickel, cobalt and manganese continuously or discontinuously increases or decreases along the circumferential surface of the secondary particle is limitedly shown on a surface region of the secondary particle, and there may be no concentration gradient in which the concentration of at least one selected from nickel, cobalt and manganese continuously or discontinuously increases or decreases in the core region of the secondary particle. Due to the limited formation of such a concentration gradient section, a charge transport channel in the positive electrode active material may be effectively formed.

Here, the core region and surface region of the secondary particle are terms introduced to explain the presence and locations of the first concentration gradient section and the second concentration gradient section present in the secondary particle, and do not mean that there is no boundary which divides the core region and the surface region in the secondary particle. That is, the core region and the surface region in the secondary particle may be regions that are continuously present without a boundary.

In one embodiment, the first concentration gradient section and the second concentration gradient section may be repeatedly present along the circumferential surface of the secondary particle.

According to the embodiment, the first concentration gradient section and the second concentration gradient section are repeatedly present along the circumferential surface of the secondary particle, but may be alternately formed.

Accordingly, the concentration of at least one selected from nickel, cobalt and manganese may repeatedly increase and decrease along the circumferential surface of the secondary particle.

A concentration of at least one selected from nickel, cobalt and manganese within the first concentration gradient section and the second concentration gradient section may exhibit a concentration gradient which is continuously or discontinuously changing.

Therefore, the concentration of at least one selected from nickel, cobalt and manganese within the first concentration gradient section may exhibit a continuously or discontinuously increasing concentration gradient, and the concentration of at least one selected from nickel, cobalt and manganese within the second concentration gradient section may exhibit a continuously or discontinuously decreasing concentration gradient.

In addition, at least one concentration gradient (slope) selected from nickel, cobalt and manganese within each of a plurality of the first concentration gradient sections present along the circumferential surface of the secondary particle may be independent of each other.

For example, provided that there are a first concentration gradient section (A), a second concentration gradient section (B), a first concentration gradient section (A'), a second concentration gradient section (B') and the like, which have repeatedly increasing and decreasing cobalt concentrations, along the circumferential surface of the secondary particle, a slope value of the concentration gradient of cobalt in the first concentration gradient section (A) and a slope value of the concentration gradient of cobalt in the first concentration gradient section (A') may be independent of each other.

Likewise, a slope value of at least one concentration gradient selected from nickel, cobalt and manganese within each of a plurality of second concentration gradient sections present along the circumferential surface of the secondary particle may be independent of each other.

For example, provided that there are a first concentration gradient section (A), a second concentration gradient section (B), a first concentration gradient section (A'), a second concentration gradient section (B') and the like, which have repeatedly increasing and decreasing cobalt concentrations, along the circumferential surface of the secondary particle, a slope value of the concentration gradient of cobalt in the second concentration gradient section (B) and a slope value of the concentration gradient of cobalt in the second concentration gradient section (B') may be independent of each other.

The above-described examples are provided to explain that a plurality of the first concentration gradient sections and a plurality of the second concentration gradient sections, which are present along the circumferential surface of the secondary particle, have independent concentration gradient slope values, and the concentration(s) of nickel and/or manganese instead of cobalt may have concentration gradients in the first concentration gradient section and the second concentration gradient section.

In addition, as described above, when the secondary particle is a spherical or sphere-like shape, the first concentration gradient section and the second concentration gradient section may be present along the circumferential direction of the secondary particle.

Here, in a part of the secondary particle, the circumferential direction may be consistent with a direction (defined as a transverse direction herein) perpendicular to a direction (defined as a longitudinal direction herein) toward the surface region of the secondary particle from the core region thereof.

That is, the first concentration gradient section and the second concentration gradient section may be present along a transverse direction perpendicular to a longitudinal direction toward the surface region of the secondary particle from the core region of the secondary particle.

Accordingly, the concentration of at least one selected from nickel, cobalt and manganese in the first concentration gradient section may increase continuously or discontinuously along the transverse direction perpendicular to the longitudinal direction toward the surface region of the secondary particle from the core region thereof. In addition, the concentration of at least one selected from nickel, cobalt and manganese in the second concentration gradient section may decrease continuously or discontinuously along the transverse direction perpendicular to the longitudinal direction toward the surface region of the secondary particle from the core region thereof.

In another embodiment, along the circumferential surface of the secondary particle, the secondary particle may include a concentration increase/decrease part having the first concentration gradient section and the second concentration gradient section and a concentration maintenance part in which the concentration of at least one selected from nickel, cobalt and manganese in the secondary particle is maintained. Referring to FIG. 4, the concentration increase/decrease part may be defined as an area including the first concentration gradient section (a) and the second concentration gradient section (b), and the concentration maintenance part may be located between concentration increase/decrease parts adjacent to each other, and defined as an area (c) in which the concentration of at least one selected from nickel, cobalt and manganese is maintained in the secondary particle.

Here, definitions of the first concentration gradient section and the second concentration gradient section in the concentration increase/decrease part are as described above.

Unlike the concentration increase/decrease part, the concentration of at least one selected from nickel, cobalt and manganese in the concentration maintenance part may not have a large change in concentration in the transverse direction perpendicular to the longitudinal direction toward the surface region of the secondary particle from the core region thereof. A concentration change rate of at least one selected from nickel, cobalt and manganese in the concentration maintenance part may be 5 wt % or less per 0.1 μm, but the present invention is not necessarily limited thereto.

That is, at least one (hereinafter, referred to as a specific metal element) selected from nickel, cobalt and manganese in the concentration maintenance part may have a small concentration change rate so that it can be distinguished from the first concentration gradient section and the second concentration gradient section.

As described above, in the secondary particle, due to the presence of the concentration increase/decrease part in which the concentration of at least one selected from nickel, cobalt and manganese exhibits concentration gradients continuously or discontinuously increasing and decreasing (that is, having a large change rate in concentration of at least one selected from nickel, cobalt and manganese) and the concentration maintenance part having a small change rate in concentration of at least one selected from nickel, cobalt and manganese, a charge transport channel in the positive electrode active material is more effectively formed.

In addition, the concentration increase/decrease part and the concentration maintenance part are repeatedly present along the circumferential surface of the secondary particle, and may be alternately formed.

The primary particle forming the secondary particle may be defined as a lithium composite oxide represented by Formula 1 below.

$$Li_wNi_{1-(x+y+z)}Co_xM1_yM2_zO_2 \qquad \text{[Formula 1]}$$

(Here,

M1 is at least one selected from Mn and Al,

M2 is at least one selected from Mn, B, Ba, Ce, Hf, Ta, Cr, F, Mg, Al, Cr, V, Ti, Fe, Zr, Zn, Si, Y, Nb, Ga, Sn, Mo, W, P, Sr, Ge, Nd, Gd and Cu, M1 and M2 are elements different from each other, $0.5 \le w \le 1.5$, $0.01 \le x \le 0.40$, $0.01 \le y \le 0.40$, and $0.001 \le z \le 0.30$.)

Here, the average diameter of the primary particle may be 0.1 to 3.0 μm, and the average diameter of the secondary particle may be 3.0 to 20.0 μm. Here, the primary particle may be in contact with an inner void without forming a grain boundary by being in contact with an adjacent primary particle, thereby forming a surface present inside the secondary particle. Meanwhile, a surface of the primary particle present on the outermost surface of the secondary particle, which is exposed to the external atmosphere, forms the surface of the secondary particle.

In addition, M3 present in the surface region of the secondary particle may exhibit a concentration gradient decreasing toward the core region of the secondary particle. That is, the direction of the M3 concentration gradient may be a direction toward the core region of the secondary particle from the surface region of the secondary particle.

Here, the secondary particle may include a first area and a second area, which have different M3 concentrations.

Here, the first area may be an area exhibiting a concentration gradient of M3, which decreases toward the core region of the secondary particle.

For example, provided that the distance from the outermost surface of the secondary particle to the core region of the secondary particle forming the lithium composite oxide is R, when an area having a distance (R') from the outermost surface of the secondary particle of 0 to 0.02R is defined as a first area, M3 present in the first area may exhibit a concentration gradient decreasing toward the core region of the secondary particle.

On the other hand, opposite to M3, Ni present in the first area may exhibit a concentration gradient increasing toward the core region of the secondary particle. Here, the core region of the secondary particle may be referred to as the median core region of the secondary particle.

Here, the concentration change rate of M3 present in the first region may be 50% or more, and preferably, 60% or more, but the present invention is not necessarily limited thereto.

In addition, the remaining areas except the first area may be defined as a second area.

For example, when the area having the distance (R') from the outer surface of the secondary particle is 0 to 0.02R is defined as a first area, an area having the distance (R') from the outer surface of the secondary particle of more than 0.02R to 1.0R may be defined as a second area. Here, M3 present in the second area may not have a concentration gradient such that a concentration increases or decreases in a certain direction in the primary particle.

In addition, although M3 present in the second area has a certain level of concentration gradient, the slope value of the concentration gradient in the second area may be smaller than that of the concentration gradient of M3 in the first area.

In another embodiment, a concentration change rate of M3 present in the second area may be 49% or less, preferably, 30% or less, and more preferably, 15% or less.

In addition, in another embodiment, the positive electrode active material may include a coating layer which covers at least a part of the surfaces of the first particle (e.g., the interface between the primary particles) and/or the second particle formed by aggregating the primary particles.

For example, the coating layer may be present to cover at least a part of the exposed surface of the primary particle. Particularly, the coating layer may be present to cover at least a part of the exposed surface of the primary particle present on the outermost surface of the secondary particle.

Accordingly, the coating layer may be present as a layer that continuously or discontinuously coats the surfaces of the primary particle and/or the secondary particle formed by aggregating the primary particles. When the coating layer is discontinuously present, it may be present in an island form.

The coating layer present as described above may contribute to the improvement in physical and electrochemical properties of the positive electrode active material.

In addition, the coating layer may be present in the form of a solid solution in which there is no boundary between the primary particle and/or the secondary particle formed by aggregating the primary particles.

The coating layer may include at least one oxide represented by Formula 2 below. That is, the coating layer may be defined as an area in which an oxide represented by Formula 2 below is present.

$$Li_aA_bO_c \qquad \text{[Formula 2]}$$

(Here,

A is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 \le a \le 6$, $0 \le b \le 4$, and $2 \le c \le 8$.)

In addition, the coating layer may include different types of oxides in one layer at the same time, or different types of oxides represented by Formula 2 above in separate layers.

The oxide represented by Formula 2 may be physically and/or chemically bound with the primary particle represented by Formula 1. In addition, the oxide may be present while forming a solid solution with the primary particle represented by Formula 1.

The positive electrode active material according to the embodiment may include a coating layer covering at least a part of the surface(s) of the primary particle (e.g., the interface between the primary particles) and/or the secondary particle formed by aggregating the primary particles, thereby increasing structural stability. In addition, when the positive electrode active material is used in a lithium secondary battery, the high temperature stability and lifetime characteristics of the positive electrode active material may be improved. In addition, the oxide may reduce residual lithium in the positive electrode active material and act as a migration pathway of lithium ions, thereby affecting the efficiency characteristics of the lithium secondary battery.

In addition, in some cases, the oxide may be present on at least a part of the interface between the primary particles and the surface of the secondary particle, and in an inner void formed in the secondary particle.

The oxide may be an oxide prepared by complexing lithium with an element represented by A, or an oxide of A, wherein the oxide may be, for example, $Li_aW_bO_c$, $Li_aZr_bO_c$, $Li_aTi_bO_c$, $Li_aNi_bO_c$, $Li_aB_bO_c$, $W_bO_c$, $Zr_bO_c$, $Ti_bO_c$ or $B_bO_c$, and the above-mentioned examples are merely described for convenience to help in understanding, but the oxide defined herein is not limited to the above-mentioned examples.

In another embodiment, the oxide may be or may further include an oxide prepared by complexing lithium with at least two types of elements represented by A. The oxide prepared by complexing lithium with at least two types of elements represented by A may be, for example, $Li_a(W/Ti)_bO_c$, $Li_a(W/Zr)_bO_c$, $Li_a(W/Ti/Zr)_bO_c$, or $Li_a(W/Ti/B)_bO_c$, but the present invention is not necessarily limited thereto.

Here, the oxide may exhibit a concentration gradient decreasing toward the core region of the secondary particle from the surface region thereof. Accordingly, the concentration of the oxide may decrease toward the core region of the secondary particle from the outermost surface thereof.

As described above, as the oxide has a concentration gradient decreasing toward the core region of the secondary particle from the surface region thereof, residual lithium present on the surface of the positive electrode active material may be effectively reduced so as to prevent side effects caused by unreacted residual lithium in advance. In addition, the oxide may prevent a decrease in crystallinity in an inner area of the surface of the positive electrode active material. In addition, the breakdown of the overall structure of the positive electrode active material by the oxide during an electrochemical reaction may be prevented.

Additionally, the coating layer may include a first oxide layer including at least one of the oxides represented by Formula 2, and a second oxide layer which includes at least one of the oxides represented by Formula 2 and includes an oxide different from the oxide included in the first oxide layer.

For example, the first oxide layer may be present to cover at least a part of the exposed surface of the primary particle present on the outermost surface of the secondary particle, and the second oxide layer may be present to cover at least a part of the exposed surface of the primary particle that is not covered by the first oxide layer and the surface of the first oxide layer.

Lithium Secondary Battery

Another aspect of the present invention may provide a positive electrode including a positive electrode current collector and a positive electrode active material layer formed on the positive electrode current collector. Here, the positive electrode active material layer may include any one of the lithium composite oxides according to various embodiments of the present invention. Therefore, since the positive electrode active material is the same as described above, for convenience, detailed description thereof will be omitted, and hereinafter, other components that have not been described above will be described.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 µm, and fine irregularities may be formed on the surface of the current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included selectively as needed.

Here, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by applying a positive electrode slurry composition prepared by dissolving or dispersing the positive electrode active material, and selectively, a binder and a conductive material in a solvent on the positive electrode current collector, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to prepare a positive electrode.

In addition, in another exemplary embodiment, the positive electrode may be prepared by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator, and selectively, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 µm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer may be formed by coating the negative electrode current collector with a negative electrode slurry composition including the negative electrode active material, a conductive material and a binder selectively included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ (0<β<2), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbonaceous material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer maybe prepared by applying a composition for forming the negative electrode active material layer, which is prepared by dissolving or dispersing a negative electrode active material, and selectively a binder and a conductive material in a solvent, on the negative electrode current collector, and drying the resulting product, or may be prepared by casting a composition for forming the negative electrode active material layer on a separate support and laminating a film obtained by delamination from the support on the negative electrode current collector.

In addition, in another exemplary embodiment, the negative electrode active material layer may be prepared by applying a composition for forming the negative electrode active material layer, which is prepared by dissolving or dispersing a negative electrode active material, and selectively a binder and a conductive material in a solvent, on the negative electrode current collector, and drying the resulting product, or may be prepared by casting a composition for forming the negative electrode active material layer on a separate support, and then laminating a film obtained by delamination from the support on the negative electrode current collector.

Meanwhile, in the lithium secondary battery, a separator is not particularly limited as long as it is generally used in a lithium secondary battery to separate a negative electrode from a positive electrode and provide a migration path for lithium ions, and particularly, the separator has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be selectively used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which can be used in production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of about 1:1 to about 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance. Therefore, lithium ions can effectively migrate.

To enhance lifespan characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifespan characteristics, it is useful in portable devices such as a mobile phone, a notebook computer and a digital camera and an electric automobile field such as a hybrid electric vehicle (HEV).

The outer shape of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to yet another exemplary embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in further detail with reference to examples. However, these examples are merely provided to explain the present invention, and it will not be interpreted that the scope of the present invention is limited by the examples below.

Experimental Example 1

(1) Preparation of Positive Electrode Active Material

Example 1

First, a lithium composite oxide was prepared by preparing nickel sulfate, cobalt sulfate and manganese sulfate, synthesizing a precursor through co-precipitation, and adding LiOH to the synthesized precursor and performing sintering. Specifically, a lithium composite oxide was obtained by mixing LiOH with a precursor, maintaining an 02 atmosphere in a sintering furnace, elevating a temperature 2° C. per minute and performing thermal treatment at 690° C. for 10 hours, followed by quenching at 10° C./min or more.

Figure 2:
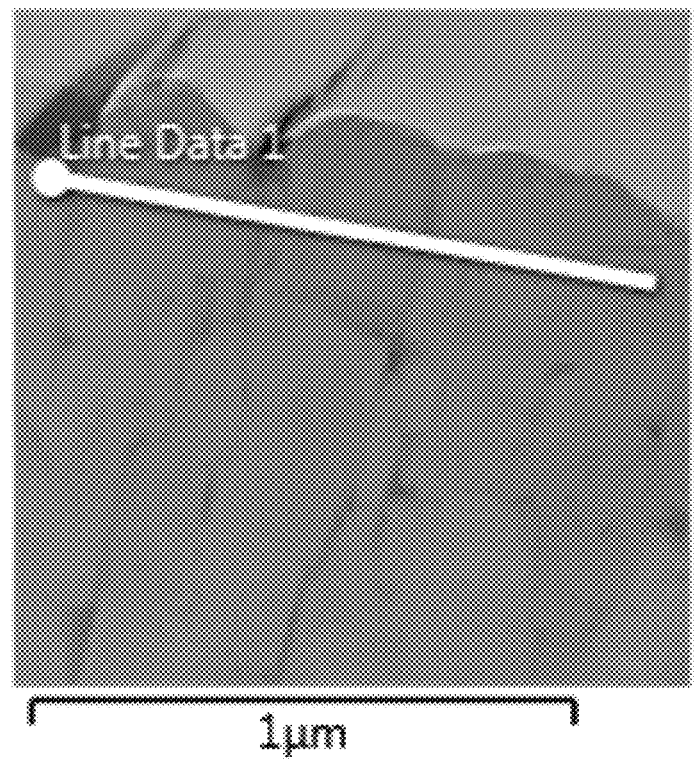
FIG. 2 is a sectional SEM image of a part (surface region) of a positive electrode active material (secondary particle) according to one embodiment of the present invention.

Subsequently, distilled water was input into the lithium composite oxide and washed for 1 hour, and then the washed lithium composite oxide was filtered and dried. The lithium composite oxide was obtained by performing drying in the same sintering furnace while maintaining an 02 atmosphere, elevating the temperature by 2° C. per minute, performing thermal treatment at 300° C. for 8 hours and then natural cooling. The sectional SEM image of the positive electrode active material is shown in FIG. 2.

Example 2

Figure 6:
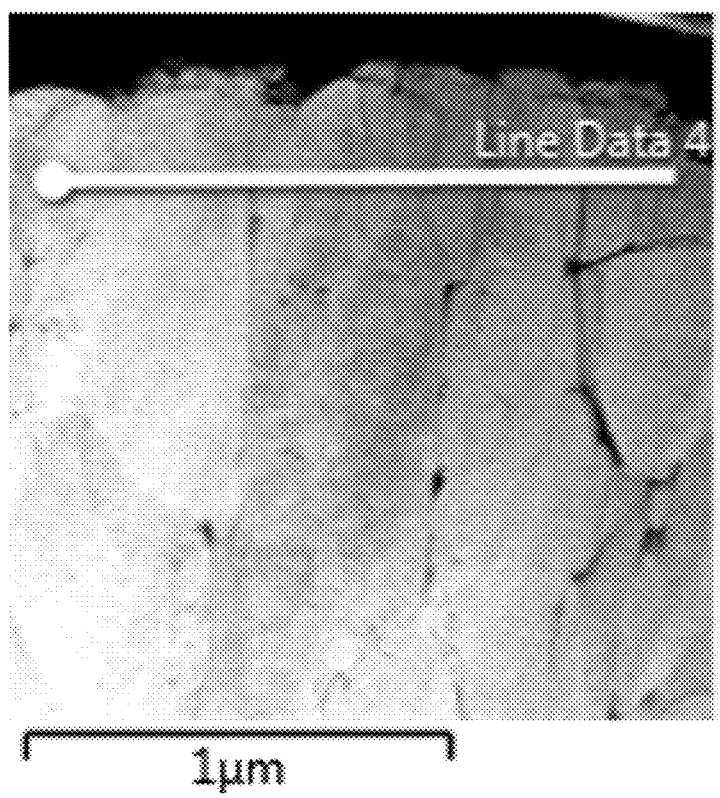
FIG. 6 is a sectional SEM image of a part (surface region) of a positive electrode active material (secondary particle) according to another embodiment of the present invention.

A lithium composite oxide was prepared in the same manner as described in Example 1, except the lithium composite oxide of Example 1 was mixed with $Al_2O_3$, $TiO_2$ and $ZrO_2$ and then additionally thermally treated to include Al, Ti and Zr in the finally produced lithium composite oxide. The sectional SEM image of the positive electrode active material is shown in FIG. 6.

Example 3

Figure 10:
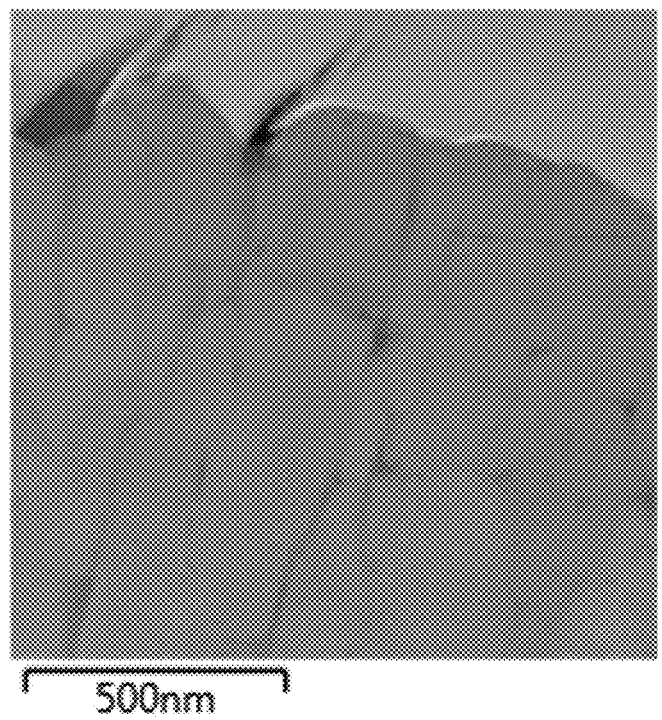
FIG. 10 is a sectional SEM image of a part (surface region) of a positive electrode active material (secondary particle) according to still another embodiment of the present invention.

A lithium composite oxide was prepared in the same manner as described in Example 1, except the lithium composite oxide of Example 1 was mixed with a B-containing raw material, $H_3BO_3$, and additionally thermally treated to include B in the finally produced lithium composite oxide. The sectional SEM image of the positive electrode active material is shown in FIG. 10.

Example 4

A lithium composite oxide was prepared in the same manner as described in Example 1, except the lithium composite oxide of Example 1 was mixed with $Al_2O_3$, $TiO_2$, $ZrO_2$ and $H_3BO_3$ and additionally thermally treated to include Al, Ti, Zr and B in the finally produced lithium composite oxide.

Comparative Example 1

Figure 14:
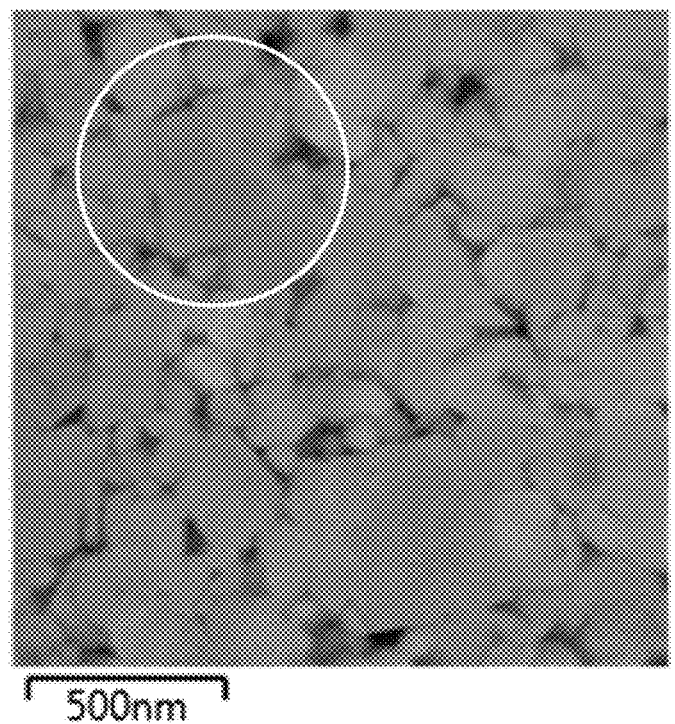
FIG. 14 is a sectional SEM image of a core region of the positive electrode active material (secondary particle) shown in FIG. 10.
Figure 15:
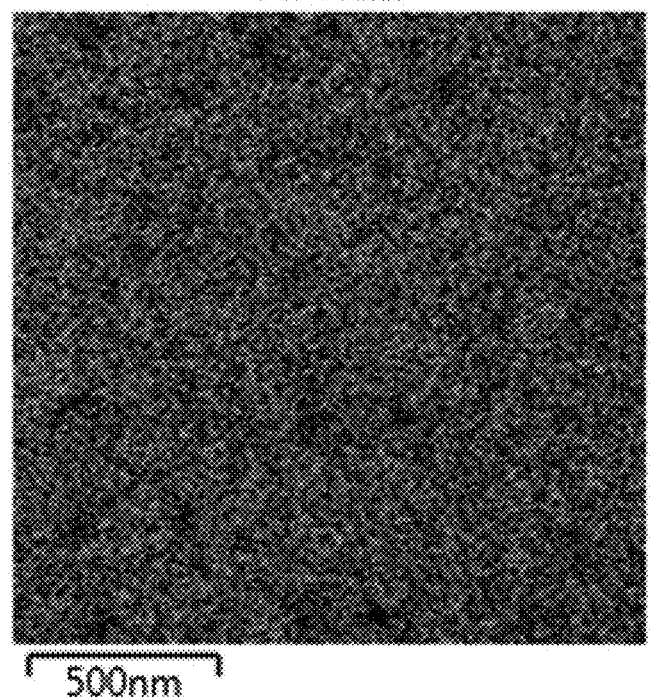
FIGS. 15 to 17 show the distribution of metal elements (Ni, Co and Mn) measured by TEM/EDX mapping for a core region of the positive electrode active material (secondary particle) shown in FIG. 14.
Figure 16:
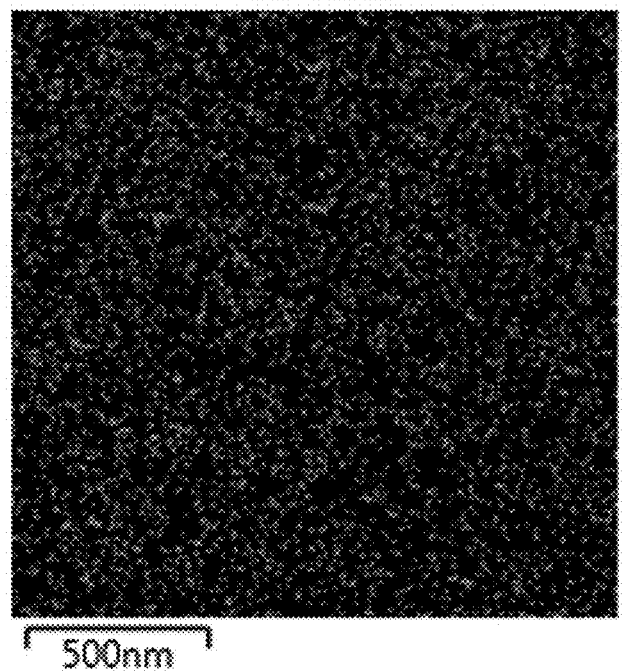
Figure 17:
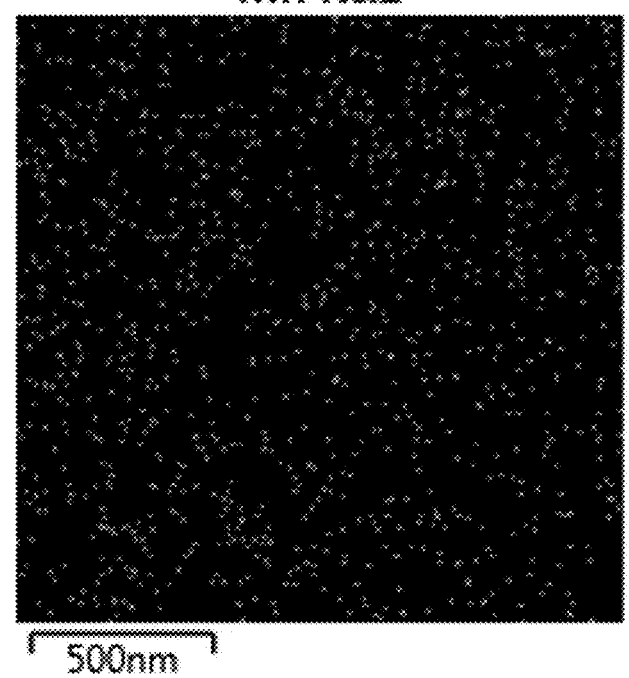

A lithium composite oxide was prepared in the same manner as described in Example 1, except a precursor was mixed with LiOH, thermally treated in a sintering furnace and naturally cooled without separate quenching. The sectional SEM image of the positive electrode active material is shown in FIG. 14.

Comparative Example 2

The lithium composite oxide of Comparative Example 1 was mixed with a Co-containing raw material ($Co_3O_4$) using a mixer. The Co-containing raw material ($Co_3O_4$) was mixed to be 30 mol % with respect to the total content of the positive electrode active material. A lithium composite oxide was prepared in the same manner as described in Comparative Example 1, except Co coating.

(2) TEM/Energy-Dispersive X-Ray Spectroscopy (TEM/EDX) for Positive Electrode Active Material Each of the positive electrode active materials (secondary particles) according to the examples and the comparative examples was subjected to sectional treatment using FIB (Ga-ion source), and then TEM images were obtained (see FIGS. 2, 6, 10 and 14).

Figure 3:
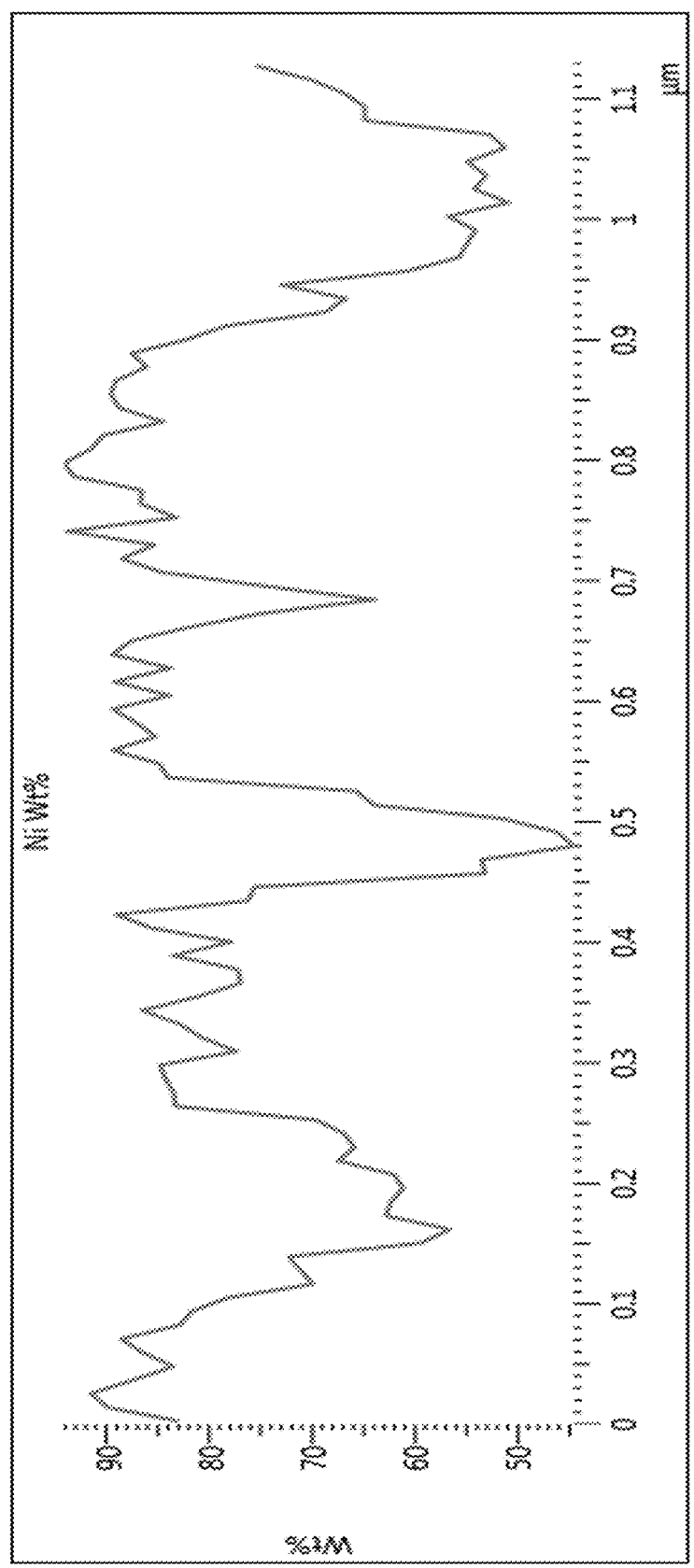
FIGS. 3 to 5 are line sum spectra showing the contents of metal elements (Ni, Co and Mn) present along a direction (transverse direction) perpendicular to a direction (longitudinal direction) toward the surface region of the secondary particle from the core region of the secondary particle of a part (surface region) of the positive electrode active material (secondary particle) shown in FIG. 2.
Figure 5:
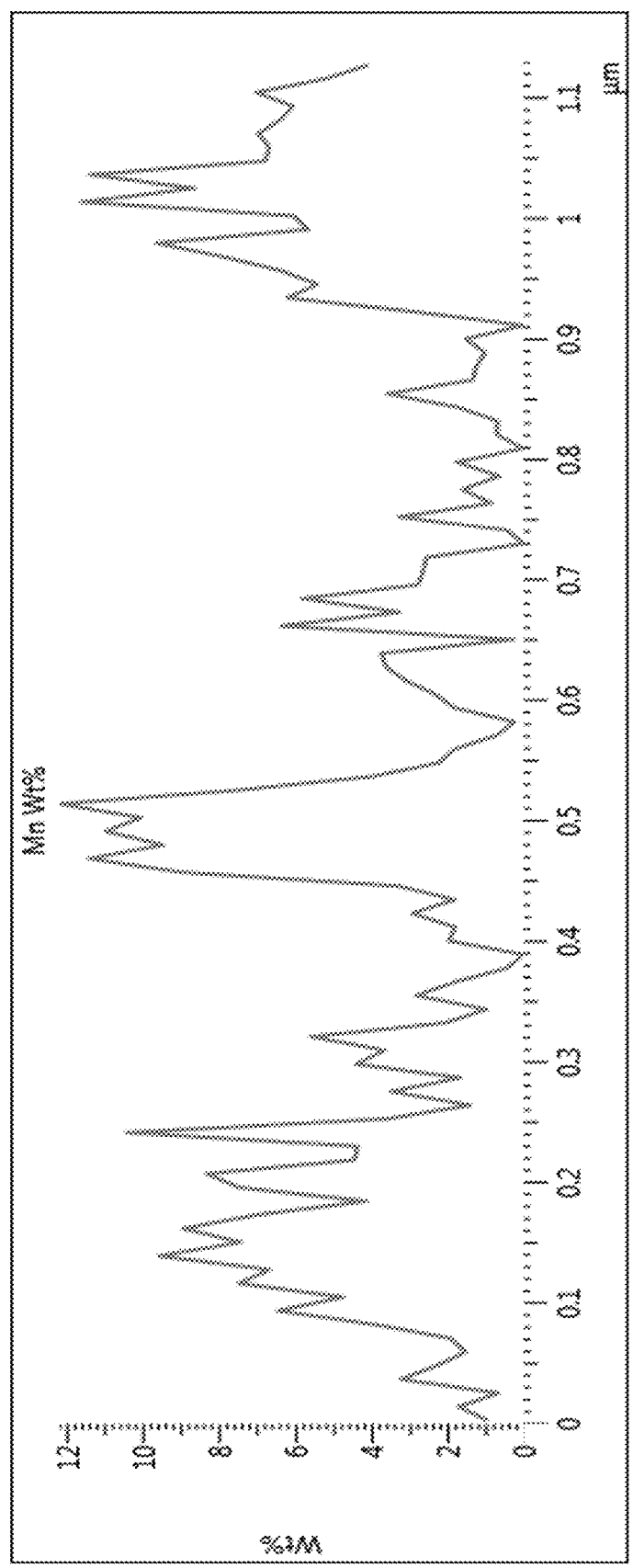

FIGS. 3 to 5 are line sum spectra showing contents of metal elements (Ni, Co and Mn) present along a direction perpendicular to a direction toward the surface region of the secondary particle from the core region thereof (longitudinal direction) in a part (surface region) of the positive electrode active material (secondary particle) according to Example 1 shown in FIG. 2. Directions of concentration gradients of the metal elements (Ni, Co and Mn) shown in FIGS. 3 to 5 are directions corresponding to the line data shown in FIG. 1.

Referring to FIG. 4, it can be confirmed that the cobalt concentration changes according to a first concentration gradient section (a) that increases in an average content (Avg) direction of cobalt in the secondary particle or a direction having a higher concentration than the average content (Avg) according to a direction along the circumferential surface of the secondary particle, that is, a direction (transverse direction) perpendicular to a direction (longitudinal direction) toward the surface region of the secondary particle from the core region of the secondary particle, and a second concentration gradient section (b) that decreases in an average content direction (Avg) of cobalt in the secondary particle or a direction having a concentration lower than the average content (Avg).

In addition, referring to FIG. 4, when the first concentration gradient section (a) and the second concentration gradient section (b) in contact with the highest point of the first concentration gradient section (a) are defined as concentration increase and decrease parts, it can be confirmed that there is a concentration maintenance part (c) in which the cobalt concentration is maintained between adjacent concentration increase/decrease parts. That is, as the cobalt concentration may tend to show a concentration gradient defined by a concentration increase/decrease part and a concentration maintenance part, a charge transport channel may be formed in the secondary particle.

Referring to FIG. 5, it can be confirmed that the manganese concentration also has a first concentration gradient section and a second concentration gradient section at a location corresponding to the cobalt concentration. Meanwhile, referring to FIG. 3, it can be confirmed that nickel shows concentration gradients which tend to be opposite to the cobalt and manganese shown in FIGS. 4 and 5. That is, it can be confirmed that the nickel concentration decreases in an average content direction of nickel in the secondary particle or a direction having a concentration lower than the average content in the first concentration gradient section of cobalt, and increases in an average content direction of nickel in the secondary particle or a direction having a concentration higher than the average content in the second concentration gradient section of cobalt.

Figure 7:
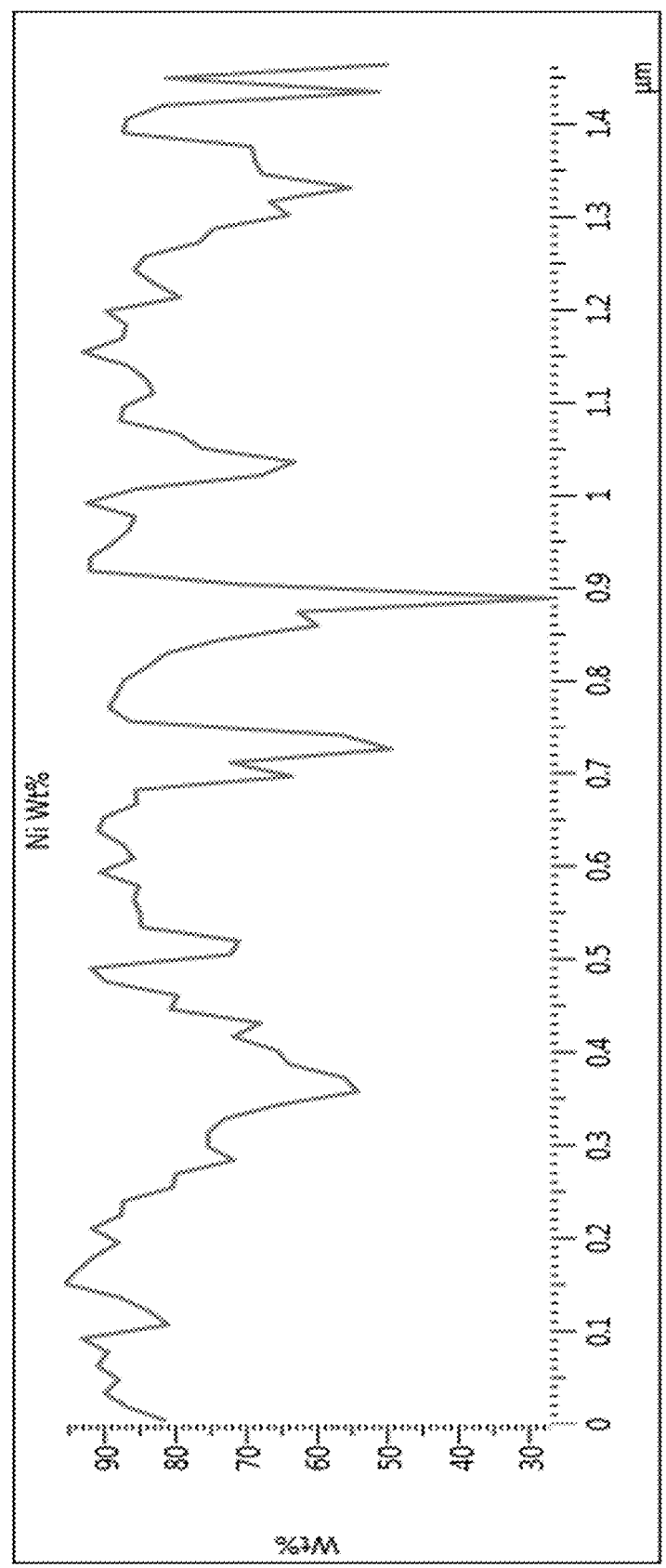
FIGS. 7 to 9 are line sum spectra showing the contents of metal elements (Ni, Co and Mn) present along a direction (transverse direction) perpendicular to a direction (longitudinal direction) toward a surface region of the secondary particle from a core region of the secondary particle of a part (surface region) of the positive electrode active material (secondary particle) shown in FIG. 6.
Figure 8:
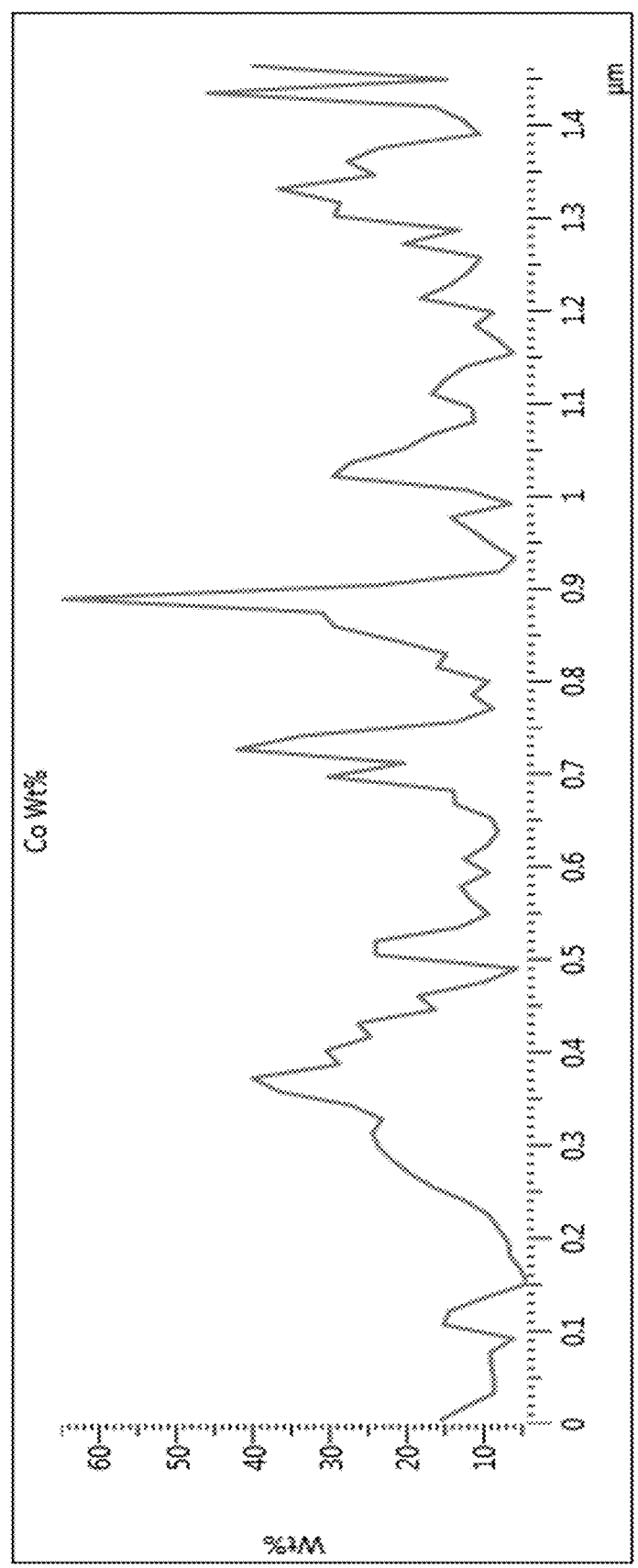
Figure 9:
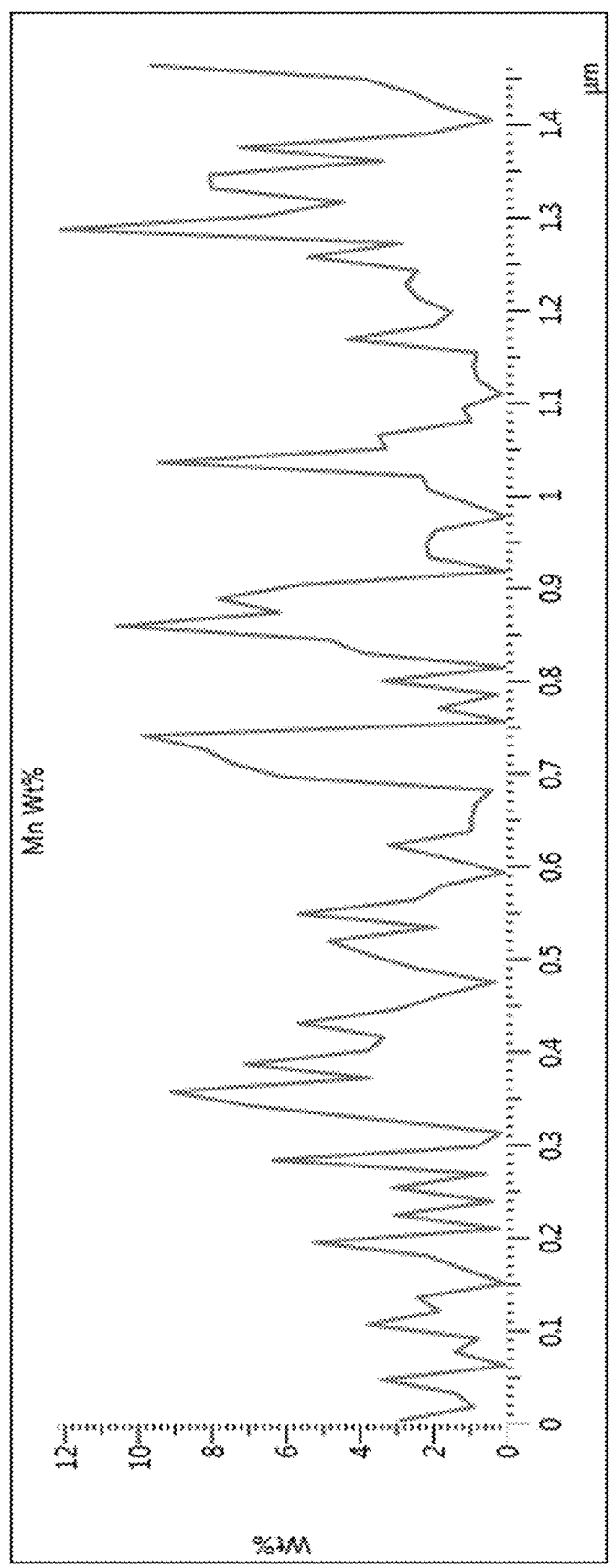

FIGS. 7 to 9 are line sum spectra showing the contents of metal elements (Ni, Co and Mn) present along a direction (transverse direction) perpendicular to a direction (longitudinal direction) toward the surface region of the secondary particle from the core region of the secondary particle of a part (surface region) of the positive electrode active material (secondary particle) shown in FIG. 6. The concentration gradient directions of the metal elements (Ni, Co and Mn) shown in FIGS. 7 to 9 are directions corresponding to the line data shown in FIG. 5. It can be confirmed that the tendencies of the concentration gradients of the metal elements (Ni, Co and Mn) shown in FIGS. 7 to 9 is similar to those of Example 1 shown in FIGS. 3 to 5.

Figure 11:
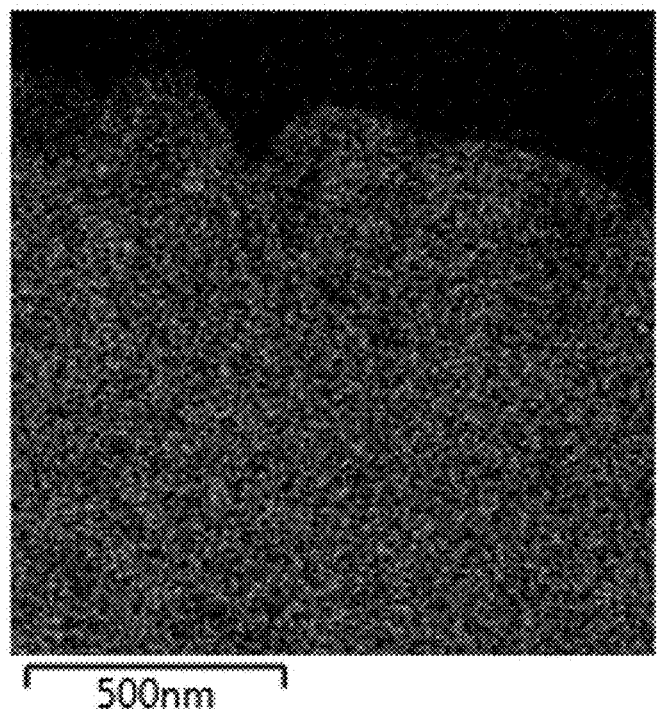
FIGS. 11 to 13 show the distribution of metal elements (Ni, Co and Mn) measured by TEM/EDX mapping for a part (surface region) of the positive electrode active material (secondary particle) shown in FIG. 10.
Figure 12:
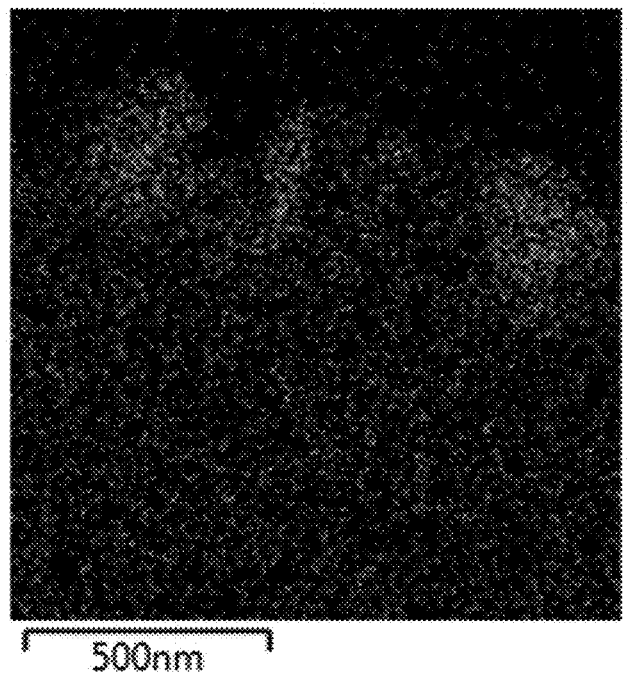
Figure 13:
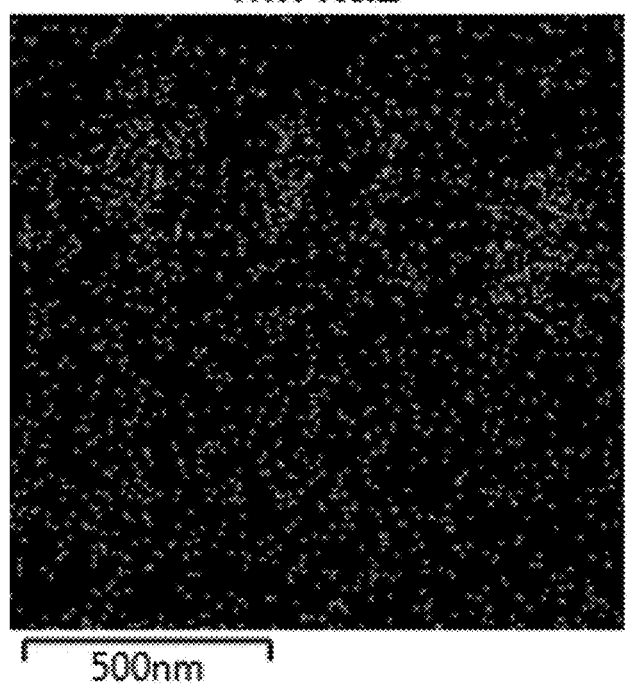

In addition, referring to FIGS. 11 to 13 showing the distribution of the metal elements (Ni, Co and Mn) measured by TEM/EDX mapping for the part (surface region) of the positive electrode active material (secondary particle) according to Example 3 shown in FIG. 10, it can be confirmed that there are concentration gradients of nickel, cobalt and manganese in the secondary particle in a direction along the circumferential surface of the secondary particle. In addition, the concentration gradient directions of nickel, cobalt and manganese are different from each other, in which, particularly, the concentration gradient directions of cobalt and manganese are the same, but the concentration gradient directions of cobalt and manganese are different from that of nickel.

Referring to FIG. 14 showing the TEM image of the core region of the positive electrode active material (secondary particle) according to Example 3 shown in FIG. 10 and FIGS. 15 to 17 showing the distribution of metal elements (Ni, Co and Mn) measured by TEM/EDX mapping for the core region of the positive electrode active material (secondary particle) according to Example 3 shown in FIG. 14, it can be confirmed that there are no concentration gradients of nickel, cobalt and manganese in the secondary particle in the core region of the secondary particle, unlike the surface region of the secondary particle.

Figure 18:
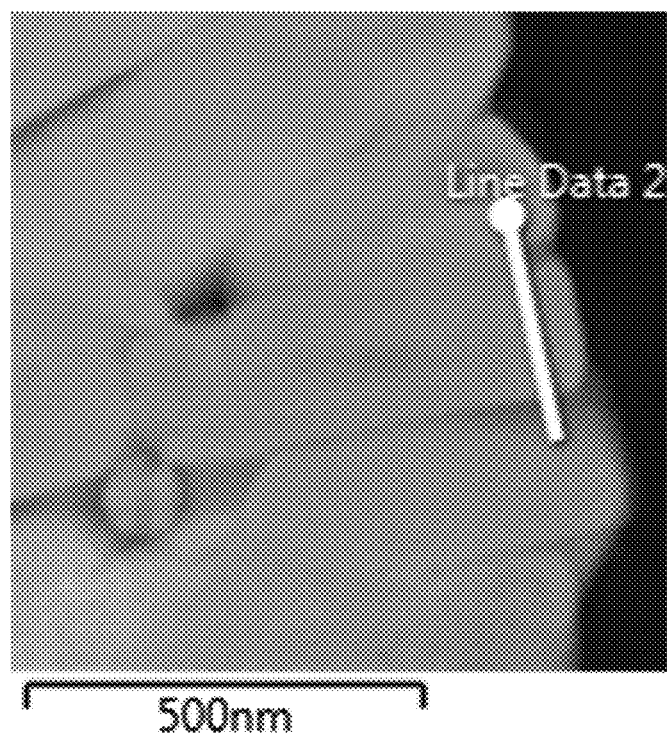
FIG. 18 is a sectional SEM image of a part of commercial NCM 811.
Figure 19:
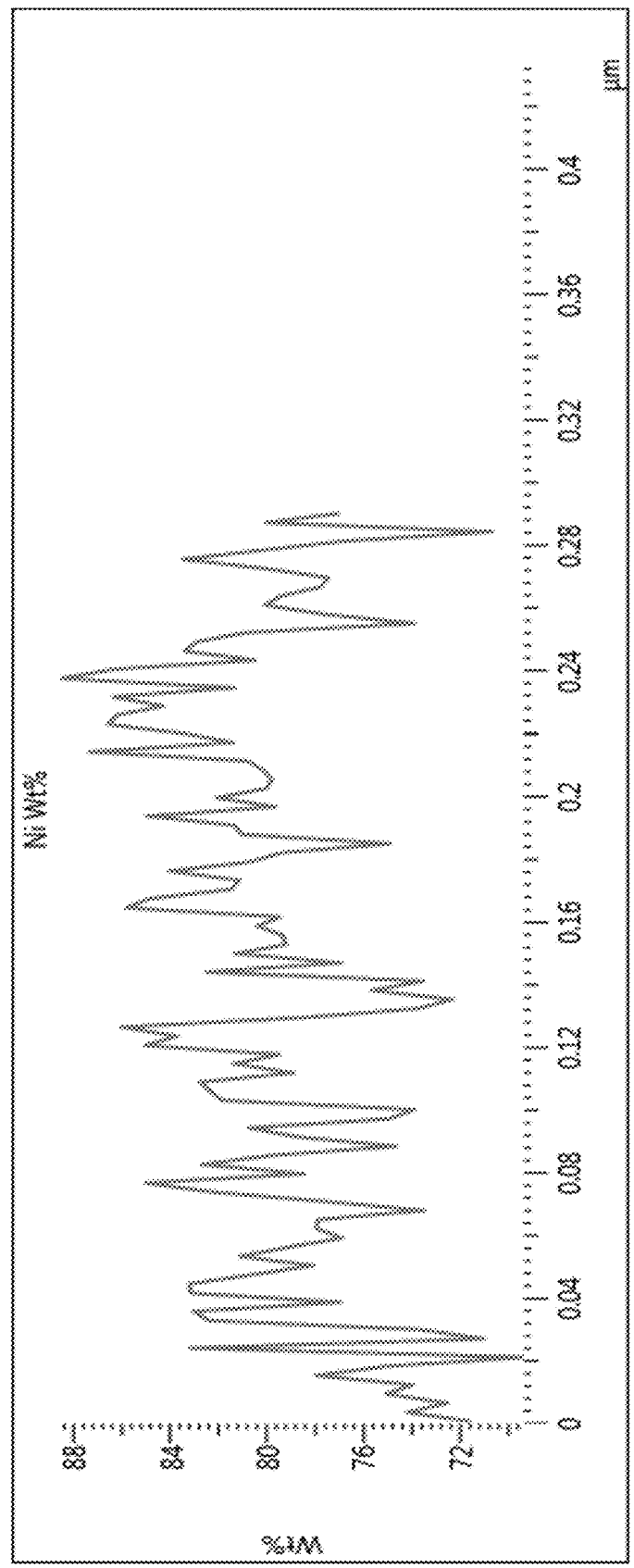
FIGS. 19 to 21 are line sum spectra showing the contents of metal elements (Ni, Co and Mn) present along a direction (transverse direction) perpendicular to a direction (longitudinal direction) toward a surface region of the secondary particle from a core region of the secondary particle of a part of the positive electrode active material (secondary particle) shown in FIG. 18.
Figure 20:
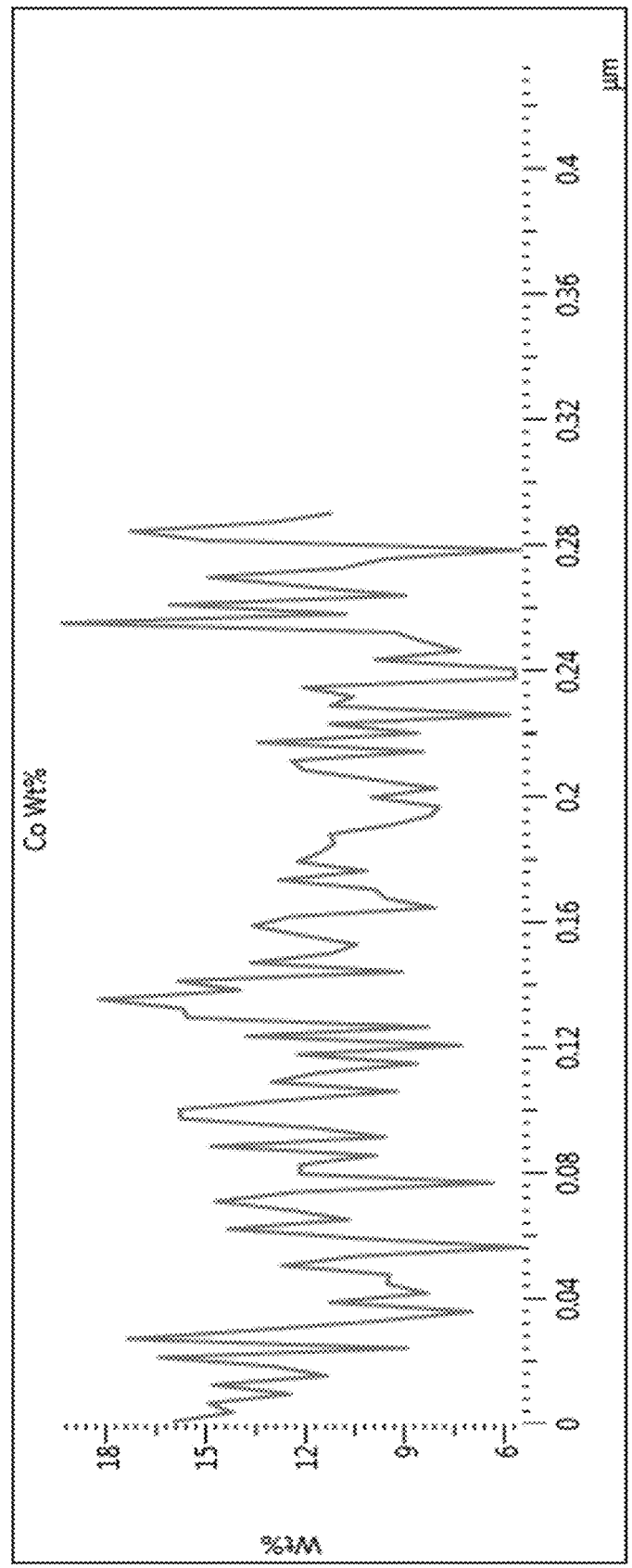
Figure 21:
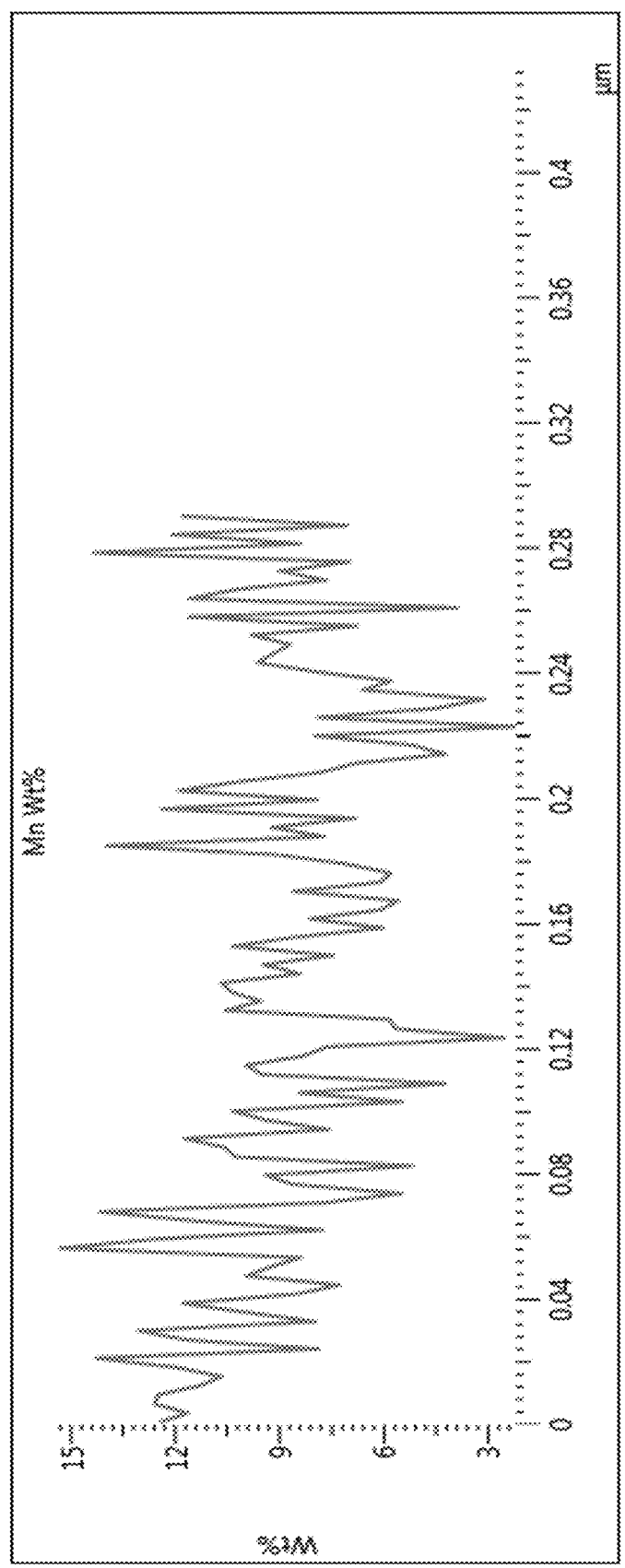

Meanwhile, referring to FIGS. 19 to 21 showing the line sum spectra indicating the contents of metal elements (Ni, Co and Mn) present along a direction (transverse direction) perpendicular to a direction (longitudinal direction) toward the surface region of the secondary particle from the core region of the secondary particle in one part (surface region) of the commercial NCM 811 shown in FIG. 18, the tendency shown by the positive electrode active material according to Examples 1 to 3 does not appear.

(3) XPS Analysis of Positive Electrode Active Material

It was confirmed whether there is a coating layer on a positive electrode active material by performing XPS analysis on each of the positive electrode active materials according to the examples and the comparative examples. The XPS analysis was performed using K-Alpha+(ThermoFisher Scientific) (acceleration voltage: 0.5 to 2 keV, energy resolution: approx. 0.5 eV, minimum analysis area: 30 microns, Monatomic and Gas Cluster Ion Source).

Tables 1 and 2 below represent XPS analysis results for the positive electrode active materials according to the examples and the comparative examples.

TABLE 1

| Classification | Al2p | B1s | Co2p | Li1s | Mn2p | Ni2p | O1s | Ti2p | Zr3d |
| --- | --- | --- | --- | --- | --- | --- | --- | --- | --- |
| Example 1 | 0 | 0 | 2.03 | 22.37 | 6.23 | 17.68 | 51.68 | 0 | 0 |
| Example 2 | 6.12 | 0 | 1.32 | 21.64 | 3.99 | 8.81 | 54.44 | 3.42 | 0.25 |
| Example 3 | 0 | 14.98 | 0.67 | 20.23 | 2.00 | 4.29 | 57.84 | 0 | 0 |
| Example 4 | 4.87 | 9.54 | 0.81 | 20.30 | 2.53 | 5.57 | 54.07 | 2.10 | 0.20 |

TABLE 2

| Classification | Al2p | B1s | Co2p | Li1s | Mn2p | Ni2p | O1s | Ti2p | Zr3d |
| --- | --- | --- | --- | --- | --- | --- | --- | --- | --- |
| Comparative Example 1 | 0 | 0 | 0.38 | 38.47 | 0.68 | 1.64 | 58.83 | 0 | 0 |
| Comparative Example 2 | 0 | 0 | 9.88 | 17.81 | 9.45 | 23.26 | 39.60 | 0 | 0 |

Referring to the results of Table 1, in the case of the positive electrode active material according to Example 1, according to XPS analysis, an Al2p, B1s, Ti2p or Zr3d peak was not shown, but Example 2 showed Al2p, Ti2p and Zr3d peaks, Example 3 showed a B1s peak, and Example 4 showed Al2p, B1s, Ti2p and Zr3d peaks. Accordingly, it can be seen that the positive electrode active materials according to Examples 2 to 4 have an oxide coating layer corresponding to peak(s) shown by the results of the XPS analysis on the surface of the lithium composite oxide.

Meanwhile, referring to the result of Table 2 showing the XPS analysis results according to Comparative Examples 1 and 2, through the fact that the size of the Co2p peak of the positive electrode active material according to Comparative Example 2 is higher than that of Comparative Example 1, it can be seen that the positive electrode active material according to Comparative Example 2 has a Co-containing oxide coating layer on the surface of the lithium composite oxide.

However, in both Comparative Example 1 and Comparative Example 2 in which the Co-containing oxide coating layer is formed on the surface of the lithium composite oxide, the concentration gradient sections caused by Co or Mn, shown in Examples 1 to 4, were not observed. From such results, it can be confirmed that the concentration gradient of a metal element present in a direction along the circumferential surface of the secondary particle found in each of the positive electrode active materials according to various embodiments of the present invention is not due to the coating layer present on the surface of the lithium composite oxide.

Experimental Example 2

(1) Manufacture of Lithium Secondary Battery

A positive electrode slurry was prepared by dispersing 94 wt % of each of the positive electrode active materials prepared according to Example 1 and Comparative Examples 1 and 2, 3 wt % of carbon black and 3 wt % of a PVDF binder in 3.5 g of N-methyl-2 pyrrolidone (NMP). A positive electrode was manufactured by coating and drying the positive electrode slurry on an aluminum (Al) thin film, which is a positive electrode current collector with a thickness of 20 μm, and performing roll pressing. The positive electrode had a loading level of 7 mg/cm$^2$, and an electrode density of 3.2 g/cm$^3$.

A coin cell battery was manufactured according to a conventionally known manufacturing process using the positive electrode, a lithium foil as a counter electrode, a porous polyethylene film (Celgard 2300, thickness: 25 μm) as a separator, and a liquid electrolyte solution in which LiPF$_6$ was dissolved in a solvent prepared by mixing ethylene carbonate and ethyl methyl carbonate at a volume ratio of 3:7 at a concentration of 1.15M.

(2) Evaluation of Electrochemical Impedance Spectroscopy (EIS) Characteristics of Lithium Secondary Battery The resistance of the lithium secondary battery (coin cell) manufactured as described above was measured within a frequency range (10 kHz to 0.01 Hz) using EIS.

Figure 22:
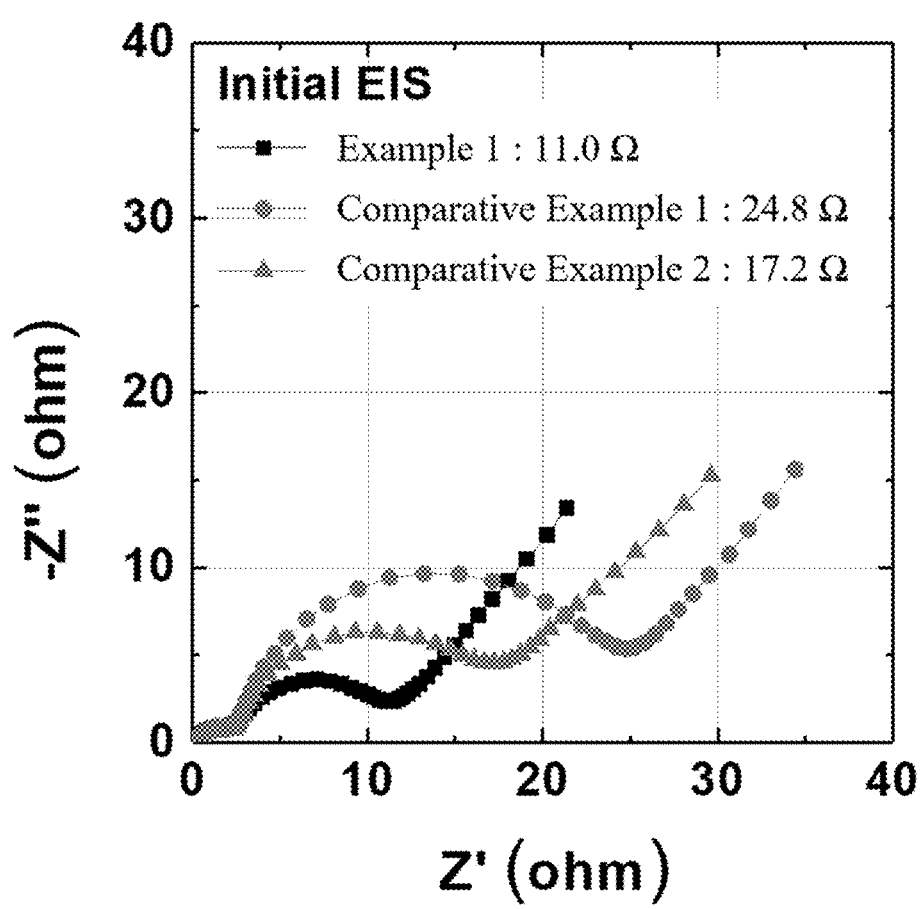
FIG. 22 is a graph showing the EIS measurement result for positive electrode active materials according to one example and comparative example of the present invention.

Referring to FIG. 22 showing the result of measuring resistance by EIS, it can be confirmed that a lithium secondary battery including each of the positive electrode active materials prepared according to Comparative Examples 1 and 2 has a significantly higher charge transfer resistance ($R_{ct}$) compared to the lithium secondary battery including the positive electrode active material prepared according to Example 1.

That is, from the above results, it can be confirmed that, by using a positive electrode active material having a first concentration gradient section which has an increasing concentration of at least one selected from nickel, cobalt and manganese therein and a second concentration gradient section which has a decreasing concentration of at least one selected from nickel, cobalt and manganese therein, along the circumferential surface of the secondary particle, the resistance characteristics of the lithium secondary battery is improved.

Positive electrode active materials according to various embodiments of the present invention can include a first concentration gradient section in which the concentration of at least one selected from nickel, cobalt and manganese increases and a second concentration gradient section in which the concentration of at least one selected from nickel, cobalt and manganese decreases in a surface region of a secondary particle, and thus a charge transport channel can be formed in the positive electrode active material.

As described above, the charge transport channel formed in the presence of the two different concentration gradient sections may solve a problem of the resistance of the positive electrode active material according to an increase in Ni content. Thus, it can contribute to the improvement in electrochemical characteristics such as lifetime and efficiency characteristics of the positive electrode active material.

In addition to the above-described effects, specific effects of the present invention will be described while describing specific details for implementing the present invention.

Above, while the examples of the present invention have been described, it will be understood by those of ordinary skill in the art that the present invention may be changed and modified in various ways by addition, alteration, or deletion of components without departing from the spirit of the present invention defined in the appended claims.

What is claimed is:

1. A positive electrode active material, comprising:
   primary particles enabling lithium intercalation and deintercalation;
   a secondary particle formed by aggregating the primary particles; and
   a coating layer,
   wherein the coating layer covers at least a part of an interface between the primary particles, or at least a part of the surface of the secondary particle, or both at least the part of the interface between the primary particles and at least the part of the surface of the secondary particle,
   wherein the secondary particle has a first concentration gradient section in which the concentration of at least one selected from nickel, cobalt and manganese in the secondary particle increases, and a second concentration gradient section in which the concentration of at least one selected from nickel, cobalt and manganese in the secondary particle decreases,
   wherein the first concentration gradient section and the second concentration gradient section are laterally arranged along the circumferential surface of the secondary particle, and
   wherein the concentration of the first concentration gradient section and the concentration of the second concentration gradient section are not due to the coating layer.

2. The positive electrode active material of claim 1, wherein the first concentration gradient section and the second concentration gradient section are present in a surface region of the secondary particle.

3. The positive electrode active material of claim 1, wherein the first concentration gradient section and the second concentration gradient section are repeatedly present along the circumferential surface of the secondary particle.

4. The positive electrode active material of claim 1, wherein the first concentration gradient section is disposed adjacent to the second concentration gradient section in a direction (transverse direction) perpendicular to a direction (longitudinal direction) toward a surface region of the secondary particle from a core region of the secondary particle.

5. The positive electrode active material of claim 1, wherein cobalt in the first concentration gradient section increases to a higher concentration than an average content of cobalt in the secondary particle.

6. The positive electrode active material of claim 1, wherein an amount of the cobalt in the second concentration gradient section decreases to be close to an average amount of the cobalt in the secondary particle.

7. The positive electrode active material of claim 1, wherein along the circumferential surface of the secondary particle, a concentration increase/decrease part having the first concentration gradient section and the second concentration gradient section and a concentration maintenance part in which the concentration of at least one selected from nickel, cobalt and manganese in the secondary particle is maintained are present.

8. The positive electrode active material of claim 7, wherein a change rate in concentration of at least one selected from nickel, cobalt and manganese in the concentration maintenance part is 5 wt % or less per 0.1 µm.

9. The positive electrode active material of claim 1, wherein the coating layer contains at least one oxide represented by the following formula:

$$Li_a A_b O_c \qquad \text{[Formula]}$$

(where A is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 \le a \le 6$, $0 \le b \le 4$, and $2 \le c \le 8$).

10. A positive electrode slurry composition, comprising: the positive electrode active material of claim 1, a conductive material and a binder.

11. A lithium secondary battery, comprising:
a positive electrode formed by coating a current collector with the positive electrode slurry composition of claim 10.

* * * * *